United States Patent
Park et al.

(10) Patent No.: US 12,508,408 B2
(45) Date of Patent: Dec. 30, 2025

(54) CHITOSAN POROUS STRUCTURE-BASED MAGNETICALLY ACTUATED MICROROBOT

(71) Applicants: BIOT KOREA INC., Gwangju (KR); KOREA INSTITUTE OF MEDICAL MICROROBOTICS, Gwangju (KR)

(72) Inventors: Jong Oh Park, Gyeonggi-do (KR); Chang Sei Kim, Gwangju (KR); Eun Pyo Choi, Gwangju (KR); Gwang Jun Go, Gwangju (KR); Hyeong Woo Song, Jeollanam-do (KR); Yeong Jun Chang, Seoul (KR); Ami Yoo, Gwangju (KR)

(73) Assignees: BIOT KOREA INC., Gwangju (KR); KOREA INSTITUTE OF MEDICAL MICROROBOTICS, Gwangju (KR)

( * ) Notice: Subject to any disclaimer, the term of this patent is extended or adjusted under 35 U.S.C. 154(b) by 795 days.

(21) Appl. No.: 17/413,993

(22) PCT Filed: Nov. 9, 2020

(86) PCT No.: PCT/KR2020/015637
§ 371 (c)(1),
(2) Date: Jun. 15, 2021

(87) PCT Pub. No.: WO2022/092385
PCT Pub. Date: May 5, 2022

(65) Prior Publication Data
US 2022/0305243 A1   Sep. 29, 2022

(30) Foreign Application Priority Data

Oct. 26, 2020 (KR) .......................... 10-2020-0139478

(51) Int. Cl.
*A61M 31/00* (2006.01)
*A61K 9/51* (2006.01)
*A61M 37/00* (2006.01)
*B82Y 5/00* (2011.01)

(52) U.S. Cl.
CPC ............. *A61M 31/002* (2013.01); *A61K 9/51* (2013.01); *A61M 37/0092* (2013.01); *B82Y 5/00* (2013.01)

(58) Field of Classification Search
None
See application file for complete search history.

(56) References Cited

U.S. PATENT DOCUMENTS

| | | | | |
|---|---|---|---|---|
| 6,444,797 B1 * | 9/2002 | Son | ...................... | A61K 9/7007 536/55 |
| 2002/0142046 A1 * | 10/2002 | Yen | .................... | A61K 47/6927 424/491 |
| 2013/0116621 A1 * | 5/2013 | Park | ...................... | C12N 11/00 435/174 |

FOREIGN PATENT DOCUMENTS

| KR | 10-0315381 B1 | 11/2001 |
|---|---|---|
| KR | 10-2020-0101577 A | 8/2020 |
| KR | 10-2020-0114843 A | 10/2020 |

OTHER PUBLICATIONS

F.J. O'Brien, B.A Harleyc, I.V. Yannasc,d, L.J. Gibson The effect of pore size on cell adhesion in collagen-GAG scaffolds Biomaterials 26 (2005) 433-441; doi:10.1016/j.biomaterials.2004.02.052 (Year: 2005).*
Li et al. Porous chitosan microspheres for application as quick in vitro and in vivo hemostat http://dx.doi.org/10.1016/j.msec.2017.03.2760928-4931/ © 2017 Published by Elsevier B.V. (Year: 2017).*
F.J. O'Brien et al.: The effect of pore size on cell adhesion in collagen-GAG scaffolds doi:10.1016/j.biomaterials.2004.02.052 (Year: 2004).*
Tailoring the Interface of Biomaterials to Design Effective Scaffolds; Parisi et al. ISSN: 2079-4983; PubMed Central Id: 6165026; Digital Object Identifier: 10.3390/jfb9030050 (Year: 2018).*
Soto, Fernando; Medical Micro/Nanorobots in Precision Medicine; Digital Object Identifier: 10.1002/advs.202002203 PubMed Central Id: 7610261; ISSN: 2198-3844 (Year: 2020).*
3D-PrintedMicroroboticTransporterswithRecapitulatedStemCellNicheforProgrammableandActiveCellDelivery; Yasa et al. DOI: 10.1002/adfm.201808992 (Year: 2019).*
Theeffectofporesizeoncelladhesionincollagen-GAGscaffolds; O'Bien et al. doi:10.1016/j.biomaterials.2004.02.052: (Year: 2004).*
TailoringtheInterfaceofBiomaterialstoDesignEffectiveScaffolds;Parisi et al. ISSN:2079-4983;PubMedCentralId:6165026; DigitalObjectIdentifier:10.3390/jfo9030050 (Year: 2018).*
StemCellTrackingwithNanoparticlesforRegenerativeMedicinePurposes:anOverview;Accomasso et al.PubMedCentralId:4709786; DigitalObjectIdentifier:10.1155/2016/7920358; ISSN:1687-966X (Year: 2016).*
Office Action of Korean Patent Application No. 10-2020-0139478, issued on Oct. 26, 2022.

* cited by examiner

*Primary Examiner* — Robert A Wax
*Assistant Examiner* — Andre Mach
(74) *Attorney, Agent, or Firm* — Harness, Dickey & Pierce, P.L.C.

(57) ABSTRACT

The present invention relates to a porous structure-based magnetically actuated microrobot and a fabricating method therefor, wherein the porous structure-based magnetically actuated microrobot is based on a natural polymer having biocompatibility and biodegradability, so that the precise targeting of the porous microrobot through the attachment of magnetic nanoparticles and the drug and cell delivery using the porous microrobot can be attained.

5 Claims, 18 Drawing Sheets

CHITOSAN POROUS STRUCTURE-BASED MAGNETICALLY ACTUATED MICROROBOT

CROSS-REFERENCE TO RELATED APPLICATIONS

This application is a national phase application of PCT Application No. PCT/KR2020/015637, filed on Nov. 9, 2020, which claims the benefit of and priority to Korean Patent Application No. 10-2020-0139478, filed on Oct. 26, 2020. The entire disclosures of the applications identified in this paragraph are incorporated herein by references.

This patent application claims priority from Korean Patent Application No. 10-2020-0139478, filed with the Korean Intellectual Property Office on Oct. 26, 2020, which is hereby incorporated by reference.

TECHNICAL FIELD

The present disclosure has been made according to project number HI19C0642010019 under the support of the Ministry of Health and Welfare, the research management institution for the above project is the Korea Health Industry Development Institute, the title of the research business is "Micro Medical Robot Practicalization Technology Development Project (R&D)", the title of the research project is "Micro medical robot recognition visualization module development and integrated system construction", the host organization thereof is the Korea Institute of Medical Microrobotics, and the research period thereof is Jun. 12, 2019 to Dec. 31, 2022.

The present disclosure relates to a porous structure-based magnetically actuated microrobot and a fabrication method therefor and, specifically, to a porous structure-based magnetically actuated microrobot retaining biodegradability and biocompatibility and having a structure facilitating cell or drug delivery.

BACKGROUND ART

Microrobots, which are directly inserted and actuated in a living body, have been recently proposed in order to minimize secondary damage suffered by patients during examination or treatment.

These microrobots can access the inside of the body through the blood vessels, oral cavity, and joint cavities through a size thereof that is less than the millimeter, and enable precise delivery to a lesion site through wireless manipulation using external forces, such as magnetic fields, light, and ultrasound. In particular, the actuation of microrobots on the basis of a magnetic field among the external forces has advantages, such as permeability of the magnetic field in the body, large work spaces of microrobots, and the generation of great force of microrobots.

Most microrobots are currently fabricated by a photo-polymerization method through two-photon lithography. In this photo-polymerization method, uniform and highly reproducible microrobots can be obtained through the precise control of two photons, but photo cross-linkers and additives included in precursor substances of microrobots may potentially change biological properties of microrobots and cause unexpected toxicity.

Moreover, the bodies of microrobot loading cells or drugs so far are composed of non-biodegradable materials, and as a result, the microrobots delivered to lesion sites permanently remain in the body and the substances secreted from microrobots are highly likely to cause potential toxicity, and therefore, such microrobots have restriction on application thereof.

Therefore, microrobots need to be fabricated such that after the microrobots are inserted into the body or deliver cells or drugs to lesion sites, the microrobots are slowly degraded and disappear and can help the proper regeneration of tissues without blocking the flow of fluids (e.g., blood, lymph, synovia, etc.) in the body.

Recently, attempts have been made to fabricate structures loading cells or drugs, by using highly biodegradable materials, but such structures have many difficulties in accurately delivering cells or drugs to desired target sites.

Accordingly, there is an urgent need to develop a porous structure-based magnetically actuated microrobot, which can deliver the loaded cells and drugs to accurate target sites while retaining biodegradability and biocompatibility.

SUMMARY

Technical Problem

In order to solve the above problems, the present inventors have endeavored to develop a porous structure-based magnetically actuated microrobot, which has a structure facilitating cell and drug delivery together with biodegradability and biocompatibility. As a result, the present inventors established that a microrobot, which is based on a porous structure having a structure facilitating cell and drug delivery together with biodegradability and biocompatibility and which is capable of microrobot precise targeting through the attachment of magnetic nanoparticles, can be fabricated, and thus completed the present disclosure.

An aspect of the present disclosure is to provide a microrobot including: a porous film; pore spaces of the porous film; and magnetic nanoparticles attached to the pore spaces.

Another aspect of the present invention is to provide a method for fabricating a microrobot, the method including a porous film manufacturing step, a porous structure forming step, and a microrobot preparing step.

Technical Solution

The present inventors conducted intensive research to develop a magnetically actuated microrobot having a structure facilitating cell and drug delivery together with biodegradability and biocompatibility, and as a result, the present inventors developed a porous structure-based magnetically actuated microrobot and thus completed the present disclosure.

Hereinafter, the present disclosure will be described in more detail.

In accordance with an aspect of the present disclosure, there is provided a microrobot including: a porous film; and magnetic nanoparticles attached to pore spaces of the porous film.

As used herein, the term "porous" refers to a state in which a solid has many pore spaces in the inside or surface thereof. The arrangement of pore spaces may be irregular, regular, or periodic.

As used herein, the term "pore space" refers to a gap which is not charged with atoms, ions, or molecules, or a gap among powder elements particles of a powdered material or the like. Metal crystals or ion crystals have pore spaces generated by lattice defects.

In the present disclosure, the porous film may contain at least one type of natural polymer selected from the group consisting of chitosan, gelatin, alginic acid, and hyaluronic acid, but is not limited thereto.

In the present disclosure, the porous film may be a chitosan porous film, but is not limited thereto.

As used herein, the term "chitosan porous film" refers to a form of a film that is manufactured as a porous film having a number of pore spaces by emulsification of a chitosan solution. The chitosan porous film has biodegradability in the living body. In addition, in the manufacturing of the chitosan porous film, the size of the pore spaces can be adjusted depending on the temperature, and magnetic nanoparticles may be bonded to the pore spaces existing in the surface of the film.

As used herein, the term "chitosan" is a kind of amino polysaccharide that exist in nature, and is a natural material, which is obtained by deacetylation of chitin contained in the shells of crab and shrimp, cuttlebones, cells walls of microorganisms, such as fungi, mushrooms, and bacteria, wherein chitosan is known to be non-toxic, biodegradable, and biocompatible, and to have biological characteristics, such as cell binding and tissue culture, antibacterial activity, hemostasis, and biocompatibility, and physiological actions, such as cholesterol lowering, intestinal metabolism, anticancer action by immunity enhancement, liver function improvement, blood sugar lowering, and heavy metal detoxification. Such chitosan has recently been widely developed across the industries, such as the medical medicine field, the field of functional membranes, the biotechnology field, the food field, the cosmetics field, the agriculture field, the chemical engineering field, and the environment field.

The basic structure of chitosan is composed of repeating units in which N-acetylglucosamine and glucosamine are linked via β-1,4-glycosidic linkage, and can be subjected to various physical and chemical modifications due to the presence of an amine group, which is cationic.

The cationic amine group of chitosan, a biopolymer having an anion, DNA, and the like form an electrostatic polyion complex, which is manufactured into nanoparticles. Maitra et al. coated a dextran-doxorubicin complex with chitosan by electrostatic attraction. Such chitosan-coated nanoparticles showed a uniform size of 100 nm, and significantly increased the residence time of an anticancer drug in the blood to increase the efficiency of cancer treatment.

A chitosan-DNA complex is generated into nanoparticles with various sizes depending on conditions, such as concentrations of chitosan and DNA, pH, temperature, and molecular weights of chitosan and DNA. The chitosan-DNA complex forms uniform nanoparticles of 100 to 500 nm under optimized conditions, and has been studied as an agent for gene therapy in various ways.

In addition, an alkyl chain, bile acid, and a hydrophobic anticancer drug (doxorubicin), which are hydrophobic materials, are chemically bound to the amine group of hydrophilic chitosan to prepare amphiphilic chitosan, which is then used to form particles by self-aggregation. The amphiphilic chitosan modified with a hydrophobic material forms self-aggregated nanoparticles in an aqueous solution, and exhibits various sizes and properties of nanoparticles according to the properties of the hydrophobic material and the number of chemically modified hydrophobic groups. In addition, chitosan nanoparticles containing an anticancer drug can be manufactured by chemically binding the hydrophobic anticancer doxorubicin directly to the main chain of chitosan.

As used herein, the term "biodegradable" generally refers to being degraded through hydrolysis and/or oxidative degradation, or being degraded enzymatically or by an effect of microorganisms, such as bacteria, yeast, strains, and algae, within a proper time.

In the present disclosure, the porous film contains at least one type of element selected from the group consisting of C, O, and N, which are main ingredients of a polymer, but is not limited thereto.

In the present disclosure, the at least one type of element selected from the group consisting of C, O, and N is a main element of a chitosan powder constituting a chitosan porous film, and an ingredient constituting the chitosan porous film itself manufactured of a chitosan solution having the chitosan powder dissolved therein.

In the present disclosure, the diameter of the pore spaces may be 35 to 130 µm, 35 to 125 µm, 35 to 120 µm, 35 to 115 µm, 35 to 110 µm, 35 to 105 µm, 35 to 100 µm, 35 to 95 µm, 35 to 90 µm, 35 to 85 µm, 35 to 80 µm, 35 to 75 µm, 40 to 130 µm, 40 to 125 µm, 40 to 120 µm, 40 to 115 µm, 40 to 110 µm, 40 to 105 µm, 40 to 100 µm, 40 to 95 µm, 40 to 90 µm, 40 to 85 µm, 40 to 80 µm, 40 to 75 µm, 45 to 130 µm, 45 to 125 µm, 45 to 120 µm, 45 to 115 µm, 45 to 110 µm, 45 to 105 µm, 45 to 100 µm, 45 to 95 µm, 45 to 90 µm, 45 to 85 µm, 45 to 80 µm, 45 to 75 µm, 50 to 130 µm, 50 to 125 µm, 50 to 120 µm, 50 to 115 µm, 50 to 110 µm, 50 to 105 µm, 50 to 100 µm, 50 to 95 µm, 50 to 90 µm, 50 to 85 µm, 50 to 80 µm, 50 to 75 µm, 55 to 130 µm, 55 to 125 µm, 55 to 120 µm, 55 to 115 µm, 55 to 110 µm, 55 to 105 µm, 55 to 100 µm, 55 to 55 µm, 55 to 90 µm, 55 to 85 µm, 55 to 80 µm, 55 to 75 µm, 60 to 130 µm, 60 to 125 µm, 60 to 120 µm, 60 to 115 µm, 60 to 110 µm, 60 to 105 µm, 60 to 100 µm, 60 to 95 µm, 60 to 90 µm, 60 to 85 µm, 60 to 80 µm, or 60 to 75 µm, but is not limited thereto.

In the present disclosure, the magnetic nanoparticles mean nanoparticles of various materials having magnetic sensitivity by containing magnetic substances therein, and the magnetic nanoparticles are not particularly limited to the specific type thereof as long as they are particles having magnetic sensitivity, but may be a magnetic substance or a magnetic alloy.

The magnetic nanoparticles exhibit the magnetic sensitivity as above, and thus enable the microrobot of the present disclosure to move to a lesion site at a high speed/high orientation by an external magnetic field system (magnetic field generation device), and can serve as an MRT contrast.

In addition, the magnetic nanoparticles can serve as an NIR responsive agent by an external magnetic field.

As used herein, the term "magnetic field" refers to a space in which lines of magnetic force stretch out, that is, a space on which a magnetic action has an effect, such as the periphery of a current or a magnet or the surface of the earth.

In the present disclosure, the magnetic nanoparticles may contain at least one type selected from the group consisting of Fe, Co, Mn, Ni, Gd, Mo, $MM'_2O_4$, $M_xO_y$, CoCu, CoPt, FePt, CoSm, NiFe, and NiFeCo, wherein:

M and M' each may be independently Fe, Co, Ni, Mn, Zn, Gd, or Cr;

x may be an integer of 1 to 3; and y may be an integer of 1 to 5, but is not limited thereto.

In the present disclosure, the diameter of the magnetic nanoparticles may be 1 to 1,000 nm, 1 to 500 nm, 1 to 300 nm, 1 to 100 nm, 1 to 50 nm, 1 to 40 nm, 1 to 30 nm, 1 to 20 nm, 1 to 10 nm, 10 to 1,000 nm, 10 to 500 nm, 10 to 300 nm, 10 to 100 nm, 10 to 50 nm, 10 to 40 nm, 10 to 30 nm, or 10 to 20 nm, for example, 10 nm, but is not limited thereto.

The magnetic nanoparticles, when having a diameter within the above range, have effects of being safe for the body even though absorbed into the body and being easy to degrade in the body. The magnetic nanoparticles, when having a diameter of less than 1 nm, may have poor magnetic sensitivity, resulting in a deterioration in imaging efficiency, and when having a diameter of greater than 1,000 nm, may result in a deterioration in applicability to the living body, such as blocking blood vessels when introduced into the living body.

In the present disclosure, the magnetic nanoparticles may be ferumoxytol, but is not limited thereto.

In the present disclosure, ferumoxytol has small-sized particles of 30 nm, approved by the U.S. Food and Drug Administration (FDA), and has a high negative charge (about −37.28 mV). Ferumoxytol is a safe ingredient that is also used as an intravenous iron supplementary treatment, and can form magnetic nanoparticles together with collagen type I through electrostatic binding.

In the present disclosure, the magnetic nanoparticles may be microporous, but is not limited thereto.

In the present disclosure, the microrobot may load cells or a drug therein, but is not limited thereto.

In the present disclosure, the cells loaded in the microrobot may adhere to the inside of the microrobot or adhere to the surface of the microrobot, but is not limited thereto.

In the present disclosure, the inside and the surface of the microrobot are differentiated by a porous structure as a boundary, and a portion that passes through the porous structure to enter the inner portion may be defined as the inside and a portion before passing through the porous structure may be defined as the surface.

In the present disclosure, the inside of the microrobot means an inner portion in which the porous structure of the microrobot is situated.

In the present disclosure, the surface of the microrobot means a portion constituting an external portion of the microrobot.

In the present disclosure, the cells loaded in the microrobot may be at least one type selected from the group consisting of stem cells, macrophages, chondrocytes, osteoblasts, neurons, fibroblasts, and cardiomyocytes, but are not limited thereto.

In the present disclosure, the stem cells may be at least one type selected from the group consisting of bone marrow-derived stem cells, cord blood-derived stem cells, adipose-derived stem cells, dedifferentiated stem cells, and embryo-derived stem cells, but are not limited thereto.

In the present disclosure, the drug loaded in the microrobot may be at least one type selected from the group consisting of proteins, peptides, vitamins, nucleic acids, synthetic drugs, and natural extracts, but is not limited thereto.

In the present disclosure, the microrobot may contain a cell adhesion-related protein, but is not limited thereto.

The cell adhesion-related protein may be at least one type selected from the group consisting of fibronectin, fibrinogen, collagen, and vitronectin, but is not limited thereto.

As used herein, the term "fibronectin" refers to a glycoprotein in the extracellular matrix (ECM), and exists as a protein that is well soluble in the cytoplasm. Fibronectin serves functions of cell adhesion, migration, and differentiation, and is contained in serum added during cell culture. During cell culture, fetal bovine serum is added to culture cells, and then the microrobot is introduced into the cultured solution, and thus, fibronectin is entirely bound to the inside or surface of the microrobot, and the cells adhere to the fibronectin bound to the microrobot. That is, the microrobot, fibronectin, and cells are connected, and thus the cells can migrate to a target lesion site.

In accordance with another aspect of the present disclosure, there is provided a method for fabricating a microrobot, the method including:

a porous film manufacturing step of manufacturing a porous film;

a porous structure forming step of processing the porous film to form a porous structure;

a microrobot preparing step of attaching magnetic nanoparticles to the porous structure to prepare a microrobot; and a material loading step of loading a material to be delivered in the microrobot.

In the present disclosure, the porous film may contain at least one type of natural polymer selected from the group consisting of chitosan, gelatin, alginic acid, and hyaluronic acid, but is not limited thereto.

In the present disclosure, the porous film may be a chitosan porous film, but is not limited thereto.

The chitosan porous film has an advantage of obtaining a desired porous structure, without a separate cross-linker, by adjusting the size of each pore space, compared with an existing method of manufacturing a porous structure by using 3D printing. As such, a scaffold having pore spaces suitable for cell sizes or for the implantation into each tissue in the body can be obtained by adjusting the size of the pore spaces of the chitosan porous film. For example, the scaffolds for adipose-derived stem cells and macrophages are known to have pore spaces of about 50 μm and 15 μm, respectively, and angiogenesis, fibroblast migration, and osteochondrogenesis are known to be promoted in pore spaces of about 10 μm, 200 μm, and 250 μm, respectively.

In the present disclosure, in the porous film manufacturing step, the porous film may be manufactured at −80 to −10° C., −80 to −15° C., −50 to −10° C., −50 to −15° C., −20 to −10° C., −20 to −15° C., or −15 to −10° C., for example, at −15° C., but is not limited thereto.

In the present disclosure, in the porous structure forming step, the film is subjected to laser processing to form a porous structure.

The laser processing may provoke a curing reaction by transferring light according to a shape to be processed.

In the present disclosure, in the microrobot preparing step, the magnetic nanoparticles are attached to the structure by electrostatic force.

The magnetic nanoparticles may be attached to respective pore spaces included in the porous structure.

In the present disclosure, in the material loading step, cells or a drug may be loaded in the microrobot, but is not limited thereto.

In the present disclosure, the cells loaded in the microrobot may be at least one type selected from the group consisting of stem cells, macrophages, chondrocytes, osteoblasts, neurons, fibroblasts, and cardiomyocytes, but are not limited thereto.

The stem cells may be at least one type selected from the group consisting of bone marrow-derived stem cells, cord blood-derived stem cells, adipose-derived stem cells, dedifferentiated stem cells, and embryo-derived stem cells, but are not limited thereto.

In the present disclosure, in the material loading step, at least one type, as a drug, selected from the group consisting of proteins, peptides, vitamins, nucleic acids, synthetic drugs, and natural extracts may be loaded in the surface or in the inside of the microrobot, but is not limited thereto.

In the present disclosure, the inside and the surface of the microrobot are differentiated by a porous structure as a boundary, and a portion that passes through the porous structure to enter the inner portion may be defined as the inside and a portion before passing through the porous structure may be defined as the surface.

In the present disclosure, the inside of the microrobot means an inner portion in which the porous structure of the microrobot is situated.

In the present disclosure, the surface of the microrobot means a portion constituting an external portion of the microrobot.

In the present disclosure, in the material loading step, a cell adhesion-related protein allows stem cells to adhere to and be loaded in the surface or the inside of the microrobot, but is not limited thereto.

The cell adhesion-related protein may be at least one type selected from the group consisting of fibronectin, fibrinogen, collagen, and vitronectin, but is not limited thereto.

The overlapping description between the method for fabricating a microrobot and the microrobot is omitted in consideration of complexity of the present specification.

Advantageous Effects

The present disclosure relates to a porous structure-based magnetically actuated microrobot having biodegradability and biocompatibility and to a fabrication method therefor, and the magnetically actuated porous microrobot of the present disclosure is based on a natural polymer having biocompatibility and biodegradability, so that precise targeting of the porous microrobot through the attachment of magnetic nanoparticles and drug and cell delivery using the magnetically actuated porous microrobot can be attained, and thus the present inventive microrobots are expected to be helpfully usable in related techniques, such as precise target therapy, without causing toxicity.

BEST MODE FOR CARRYING OUT THE INVENTION

The present disclosure relates to a microrobot including: a porous film; and magnetic nanoparticles attached to pore spaces of the porous film.

DETAILED DESCRIPTION

Hereinafter, the present disclosure will be described in more detail with reference to examples. These examples are only for illustrating the present invention, and it would be obvious to those skilled in the art that the scope of the present invention is not construed as being limited to the examples.

Preparative Example 1: Manufacturing of Chitosan Porous Film

A chitosan porous film with multiple pore spaces existing therein was manufactured using chitosan, which is a material for fabricating a microrobot.

Figure 1A:
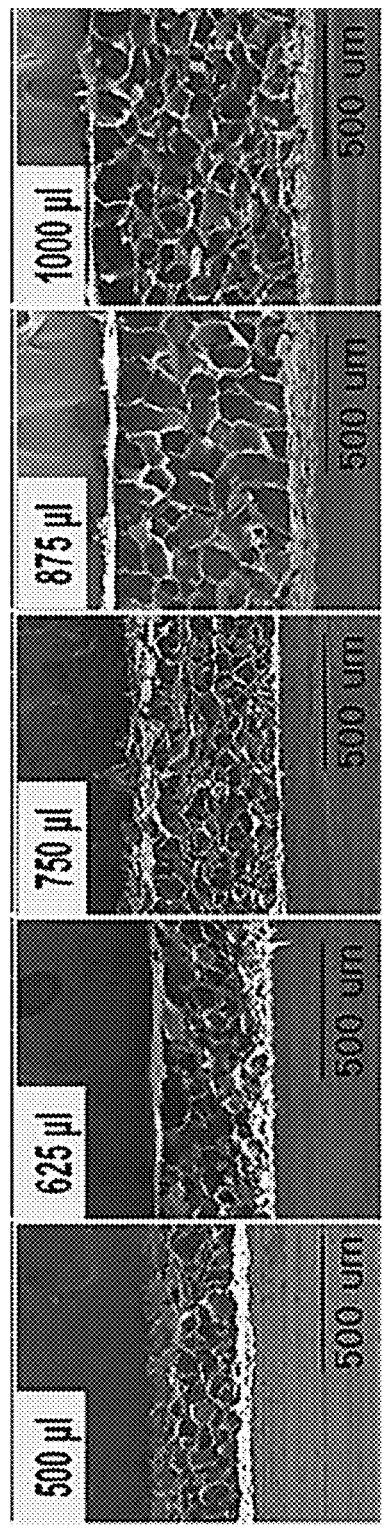
FIG. 1A provides images showing the thickness of a chitosan porous film depending on the volume of a chitosan solution according to a preparative example of the present disclosure.
Figure 1B:
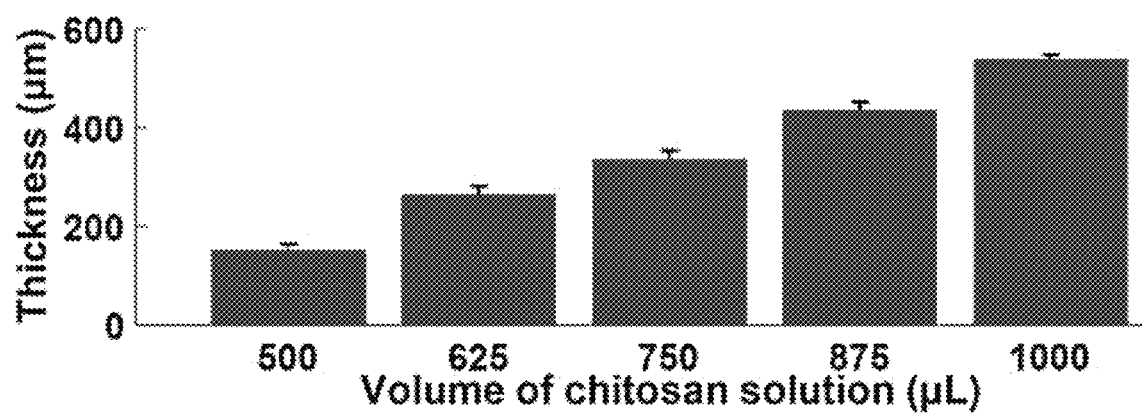
FIG. 1B is a graph showing the thickness of a chitosan porous film depending on the volume of a chitosan solution according to a preparative example of the present disclosure.

1-1. Observation of Volume Change of Chitosan Film Depending on Volume of Chitosan Solution A chitosan powder was dissolved in 1% v/v acetic acid to prepare a 1.5% v/v chitosan solution. Then, residual impurities were removed using a filter with a filter pore size of 100 μm. Thereafter, 500, 625, 750, 875, and 1000 uL of solutions were poured on respective polystyrene molds with a diameter of 35 mm, and the thickness change depending on the volume of the solution was observed. There was a difference in thickness of the porous film depending on the volume of the chitosan solution, and it was verified that the thickness of the porous film increased with the increase in volume of the chitosan solution (FIGS. 1A and 1B).

The size of the microrobot increased with the increase in thickness of the porous film, which may lead to an increase in amount of cells or a drug that can be loaded, but a too large thickness of the porous film may restrict the accessible site of the microrobot within the body due to a large volume of the microrobot. Therefore, it is important to select the thickness of the porous film as appropriate.

1-2. Manufacturing of Chitosan Porous Films Having Various-Sized Pore Spaces

During the freezing of a chitosan solution, water was changed into ice crystals to undergo an emulsification step with chitosan. Only the ice as a solvent was removed by freeze-drying, and the remaining chitosan has a porous structure.

Therefore, the ice crystals formed in the emulsification step determine the size of pore spaces constituting the porous structure. The size of these ice crystals gradually decreases with the lowering in freezing temperature, and in order to investigate this, the manufactured molds were placed in a refrigerator and stored at −10, −15, −20, and −80° C. for 12 hours. The ice crystals were grown in the chitosan solution, followed by freeze drying for 12 hours in a freeze-dryer (FDCD-12003, OPERON, Korea), thereby manufacturing chitosan porous films (FIGS. 1C to 1E).

Figure 1C:
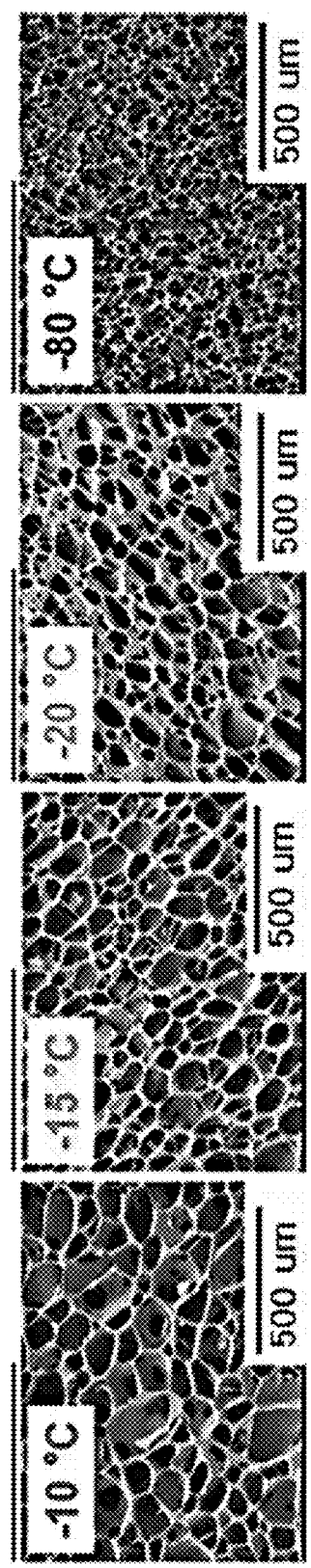
FIG. 1C provides images showing the pore space size of a chitosan porous film depending on the temperature according to a preparative example of the present disclosure.
Figure 1D:
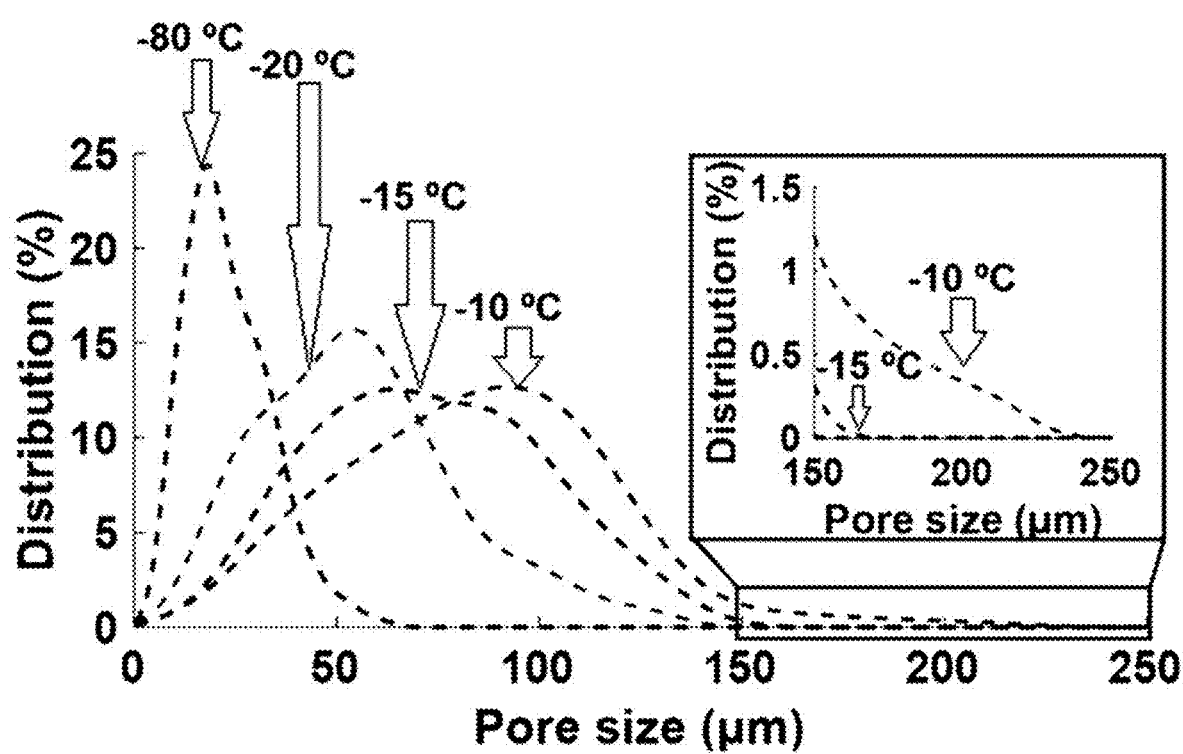
FIG. 1D is a graph showing the pore space size of a chitosan porous film depending on the temperature according to a preparative example of the present disclosure.
Figure 1E:
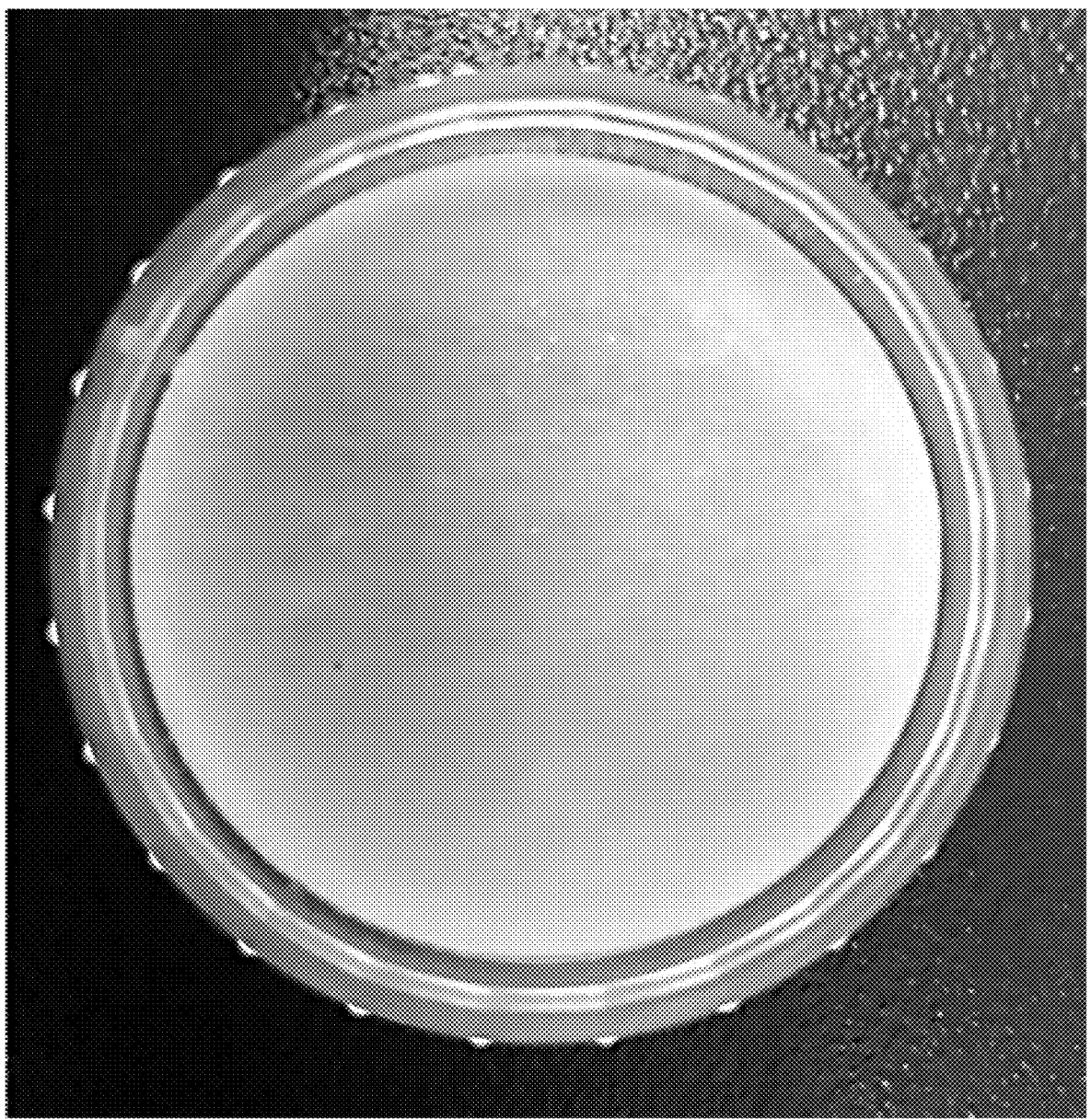
FIG. 1E is an image showing a chitosan porous film manufactured according to a preparative example of the present disclosure.

It was verified that the size of pore spaces was reduced the most at −80° C., which corresponds to the lowest temperature (FIG. 1C). It could be verified that as the lower the temperature, the smaller the size of pore spaces of the chitosan porous film, and thus the size of pore spaces of the chitosan porous film was adjusted through temperature control (FIG. 1D).

The chitosan porous film for fabrication of a microrobot was manufactured so as to have pore spaces of 35 to 130 μm at −15° C. in order to load large-sized cells as a cell therapeutic agent.

When two photons were controlled by existing photopolymerization through two-photon lithography in order to form uniform pore spaces, photo cross-linkers and additives contained in a precursor of a microrobot potentially changed biological properties of the microrobot, causing unpredicted toxicity. Whereas, the chitosan porous film manufactured as shown in FIG. 1E was composed of a biocompatible material, so that the chitosan porous film can minimize an immune response in vivo when inserted in the living body.

Preparative Example 2: Manufacturing Method for Chitosan Porous Structure of Chitosan Porous Film Through Laser Micro-Processing The chitosan porous film manufactured in Preparative Example 1 was cut by the Femtosecond pulse UV laser cutting machine (maximum 6 W, 343 nm wavelength) using various microrobot shapes designed by a computer-aided design; CAD) software, and subjected to laser micro-processing. After the laser micro-processing, the laser-unprocessed portion of the chitosan porous film was mechanically exfoliated from the mold by using a tweezer. In order to remove residual acetic acid introduced while the chitosan powder was dissolved in acetic acid during the manufacturing of the chitosan porous film, the laser processing-finished chitosan porous structure was immersed in an ethanol solution at 100, 80, 50, 30, and 0% for 2 hours, thereby finishing the processing of the chitosan porous structure (FIGS. 2A and 2B).

Figure 2A:
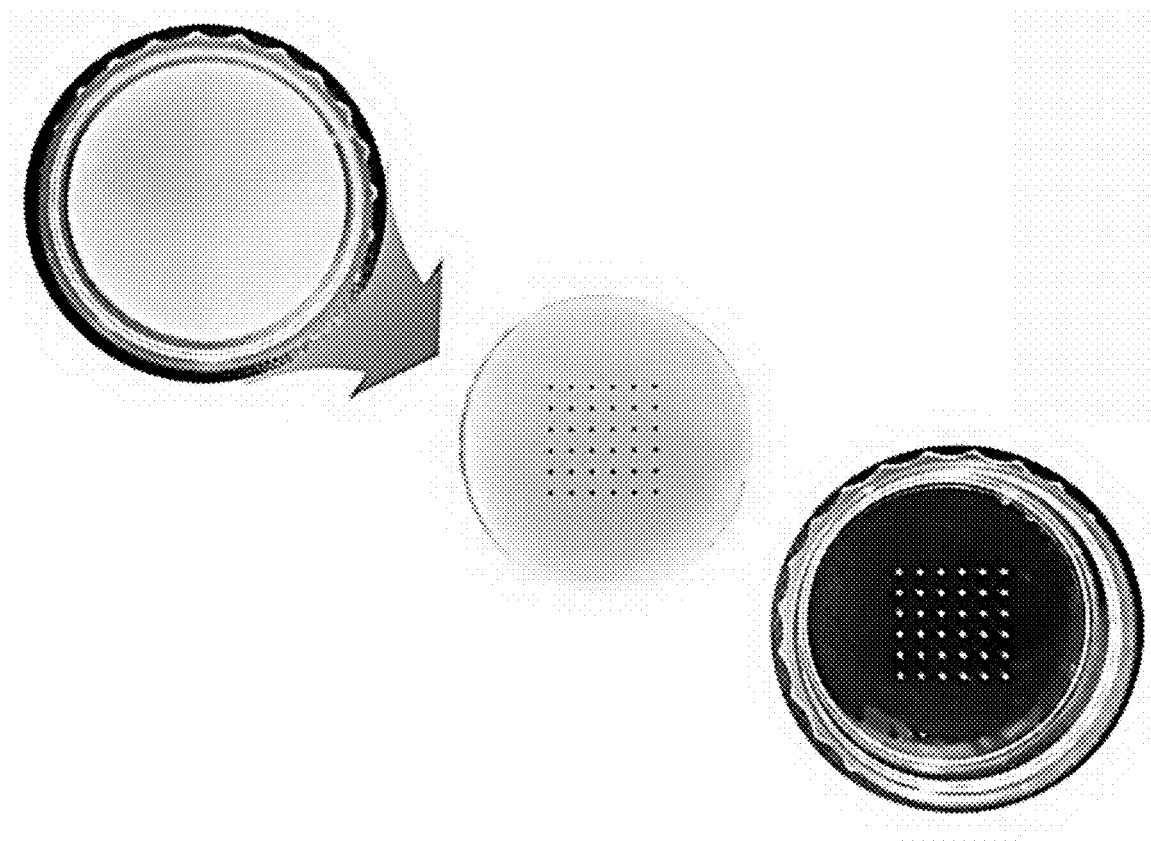
FIG. 2A is an image showing a chitosan porous structure obtained by laser micro-processing according to a preparative example of the present disclosure.
Figure 2B:
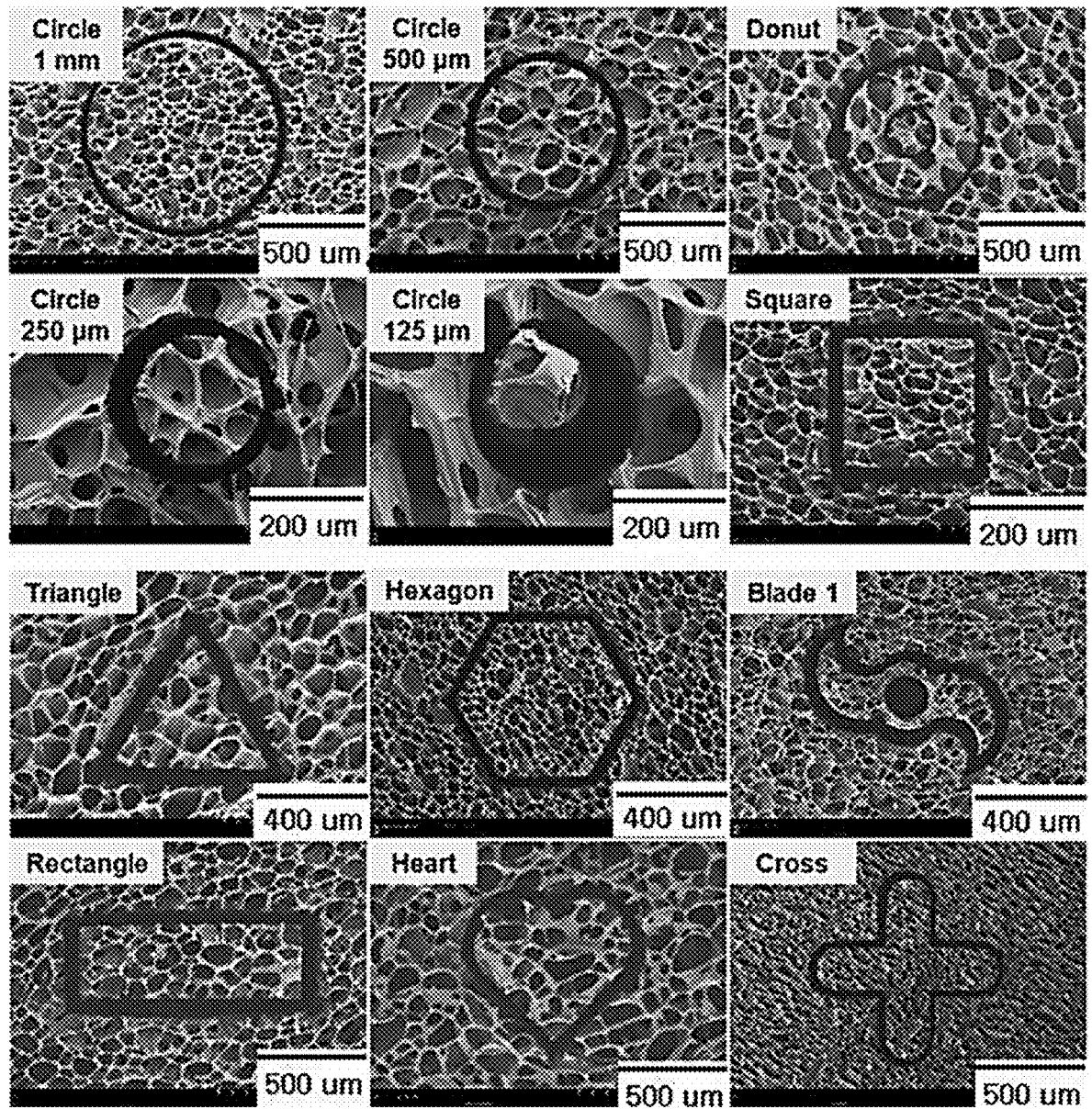
FIG. 2B provides scanning electron microscope (SEM) images of porous structures processed in various shapes according to a preparative example of the present disclosure.

As shown in FIG. 2A, it can be verified that pore spaces were formed in the chitosan porous structure. In addition, as shown in FIG. 2B, confirmed by scanning electron microscope (SEM), the chitosan porous structure can be manufactured to have various sizes and various shapes of a circle, a donut, a square, a triangle, a hexagon, a heart, or a cross.

Preparative Example 3: Fabrication of Chitosan Porous Robot Containing Magnetic Nanoparticles A chitosan porous microrobot containing magnetic nanoparticles was fabricated using the laser micro-processing-finished chitosan porous structure.

Figure 3A:
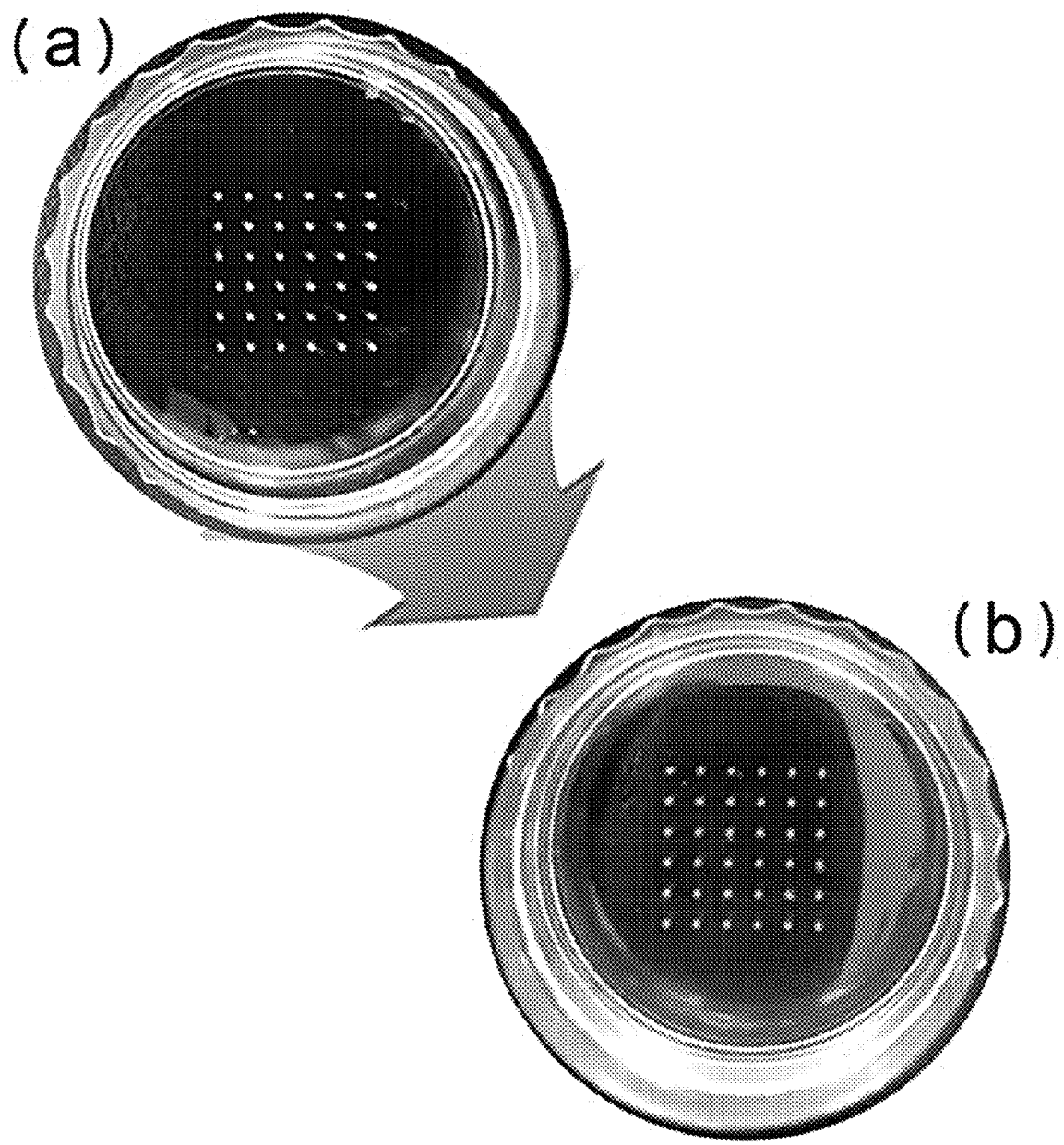
FIG. 3A is an image showing a magnetic particle-attached magnetically-actuated chitosan porous microrobot according to a preparative example of the present disclosure.

Referring to FIG. 3A, a chitosan porous microrobot according to the preparative example of the present disclosure is composed of a chitosan porous structure that was three-dimensionally manufactured using a chitosan porous film. The chitosan porous structure disclosed in (a) of FIG. 3A has a plurality of pore spaces. The chitosan porous microrobot disclosed in (b) of FIG. 3B was fabricated by binding magnetic nanoparticles to the plurality of pore spaces.

The magnetic nanoparticles bound to respective pore spaces can move independently by a magnetic field applied from the outside, and especially, when inserted in the living body, the magnetic nanoparticles serve to accurately move the chitosan porous microrobot to a target lesion site.

3-1. Manufacturing of Magnetic Nanoparticles

The magnetic nanoparticles, which are formed of ferumoxytol, were small-sized particles of 30 nm, approved by the U.S. Food and Drug Administration (FDA), and had a high negative charge (about −37.28 mV). This ferumoxytol, together with collagen type I, formed magnetic nanoparticles through electrostatic binding.

As a specific manufacturing method for the magnetic nanoparticles, 0.5 mg/mL collagen type I was first dissolved in 1% v/v acetic acid. Thereafter, 1 mL of ferumoxytol was poured into 20 mL of a collagen solution, followed by mixing. The mixed solution was stirred at 2500 rpm for 2 hours, and then washed six times with deionized water by centrifugation and stirring, thereby obtaining magnetic nanoparticles.

3-2. Fabrication of Chitosan Porous Microrobot

The prepared magnetic nanoparticles were attached to the surface of the laser-processed chitosan porous structure through electrostatic binding.

During the adsorption of magnetic nanoparticles, the magnetization direction of the microrobot was determined through two permanent neodymium magnets (N35 grade, 50 mm diameter and 10 mm thickness) separated by 50 mm. After magnetizing for 6 hours, the residual magnetic nanoparticles were washed three times with deionized water, and the microrobot thus fabricated was stored in deionized water at room temperature before use.

Figure 3B:
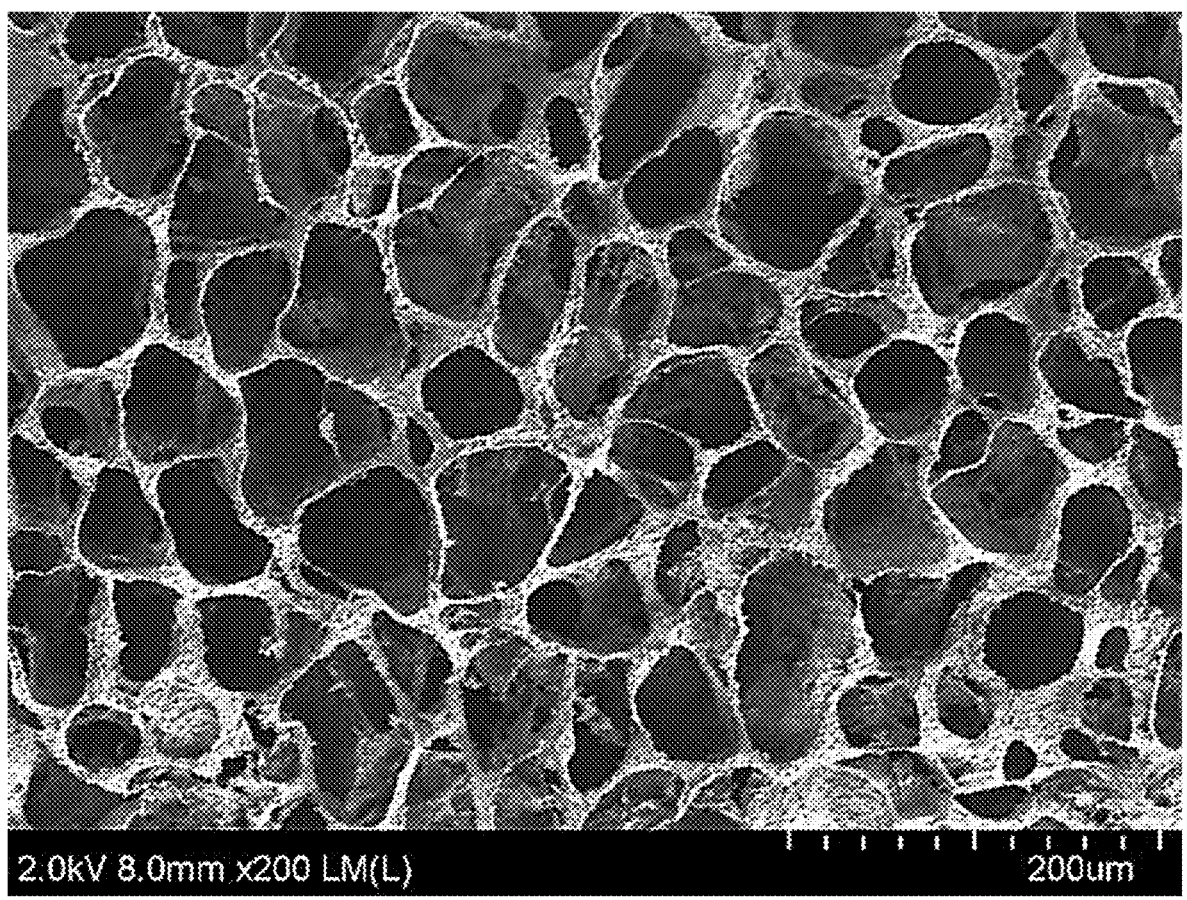
FIG. 3B is a scanning electron microscope image of a porous structure before the attachment of magnetic nanoparticles according to a preparative example of the present disclosure.
Figure 3C:
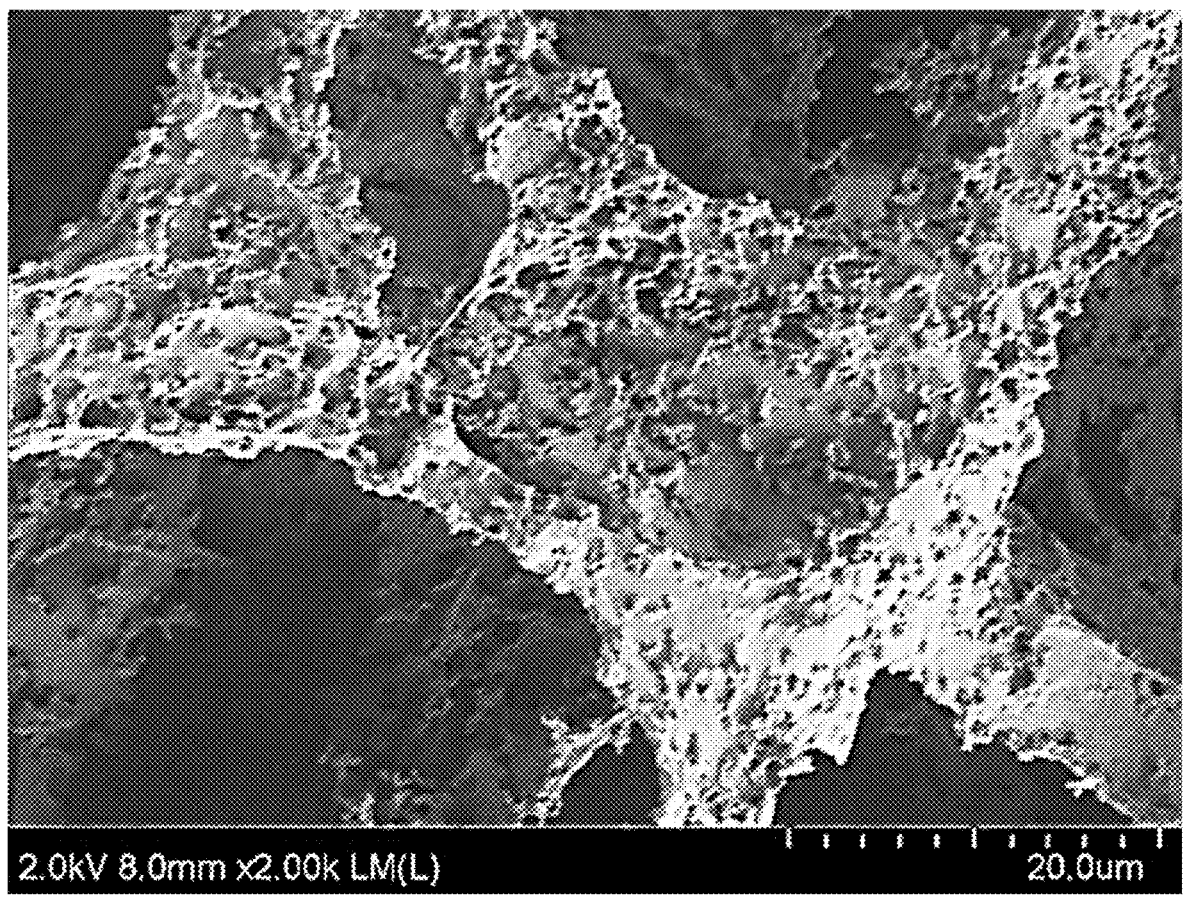
FIG. 3C is a scanning electron microscope image of a figure in which magnetic nanoparticles are bound to pore spaces according to a preparative example of the present disclosure.

As a result of observing the chitosan porous microrobot thus fabricated through a scanning microscope, the chitosan porous structure before the attachment of the magnetic nanoparticles had smooth surface characteristics (FIG. 3B). Whereas, it was verified that the structure having magnetic nanoparticles attached to pore spaces thereof had rough surface characteristics due to the attachment of magnetic particles (FIG. 3C).

Figure 3D:
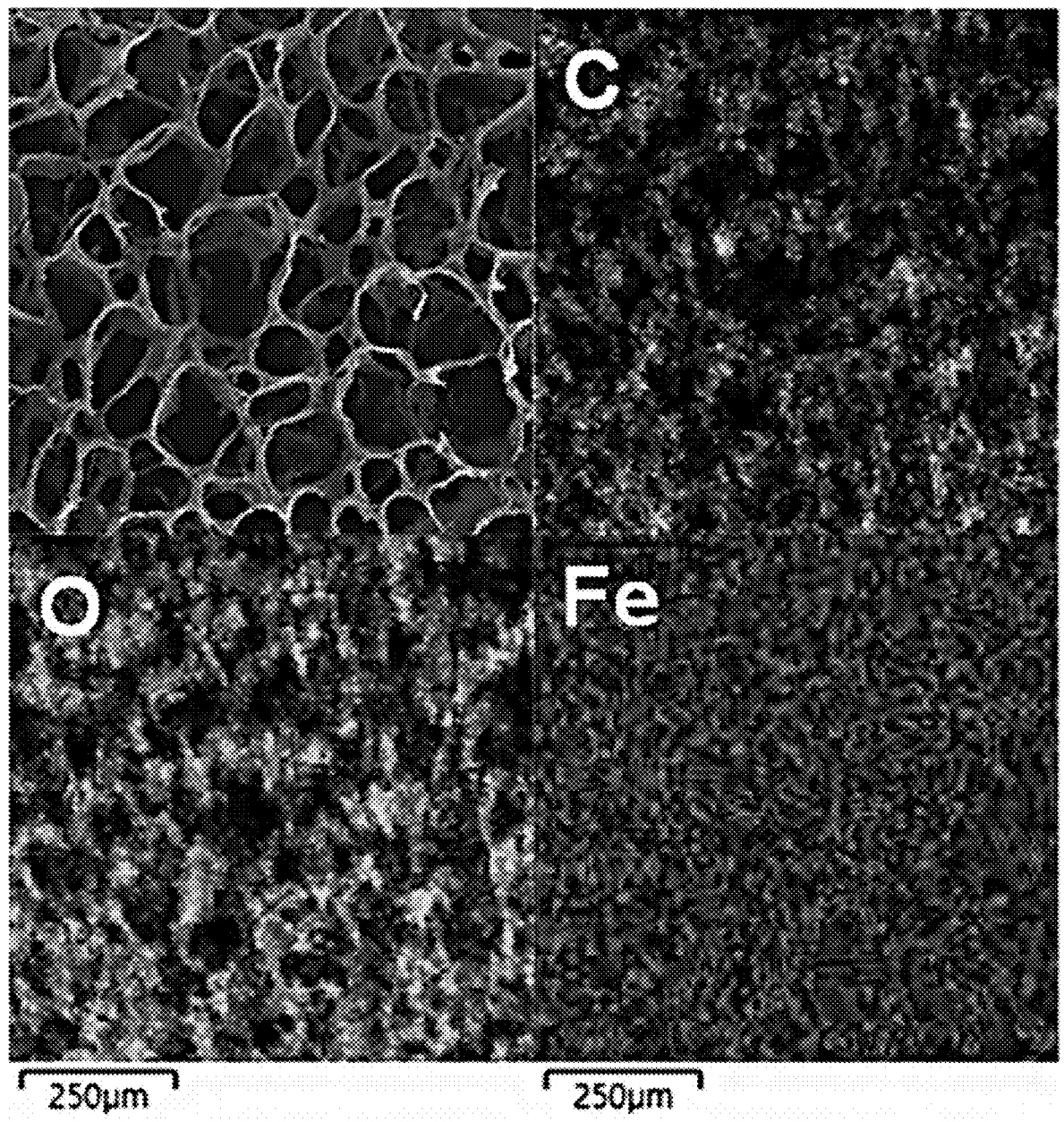
FIG. 3D provides images showing elements of the microrobot to which magnetic particles are attached, as analyzed by energy dispersive spectrometry (EDS) according to a preparative example of the present disclosure.

In addition, as a result of analyzing elements of the chitosan porous microrobot through energy dispersive spectrometry (EDS), C and O, which are ingredients derived from the chitosan porous structure, were confirmed. Whereas, Fe was derived from the magnetic nanoparticles, and this indicated that in the chitosan porous microrobot, the magnetic particles were bound to the respective pore spaces of the chitosan porous structure (FIG. 3D).

Example 1: Test of Magnetic Reactivity of Chitosan Porous Microrobots

Figure 4A:
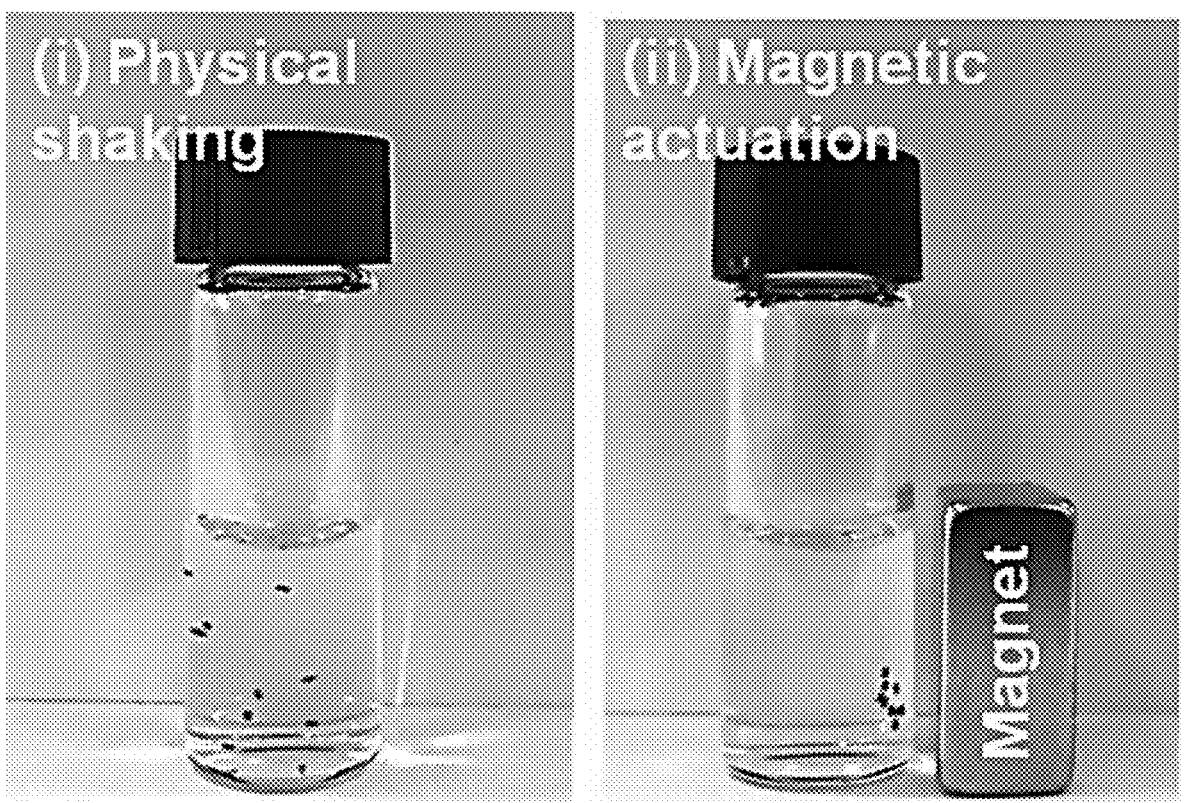
FIG. 4A provides images showing the experimental results of verifying magnetic reactivity of a microrobot by using a permanent magnet according to an example of the present disclosure.
Figure 4B:
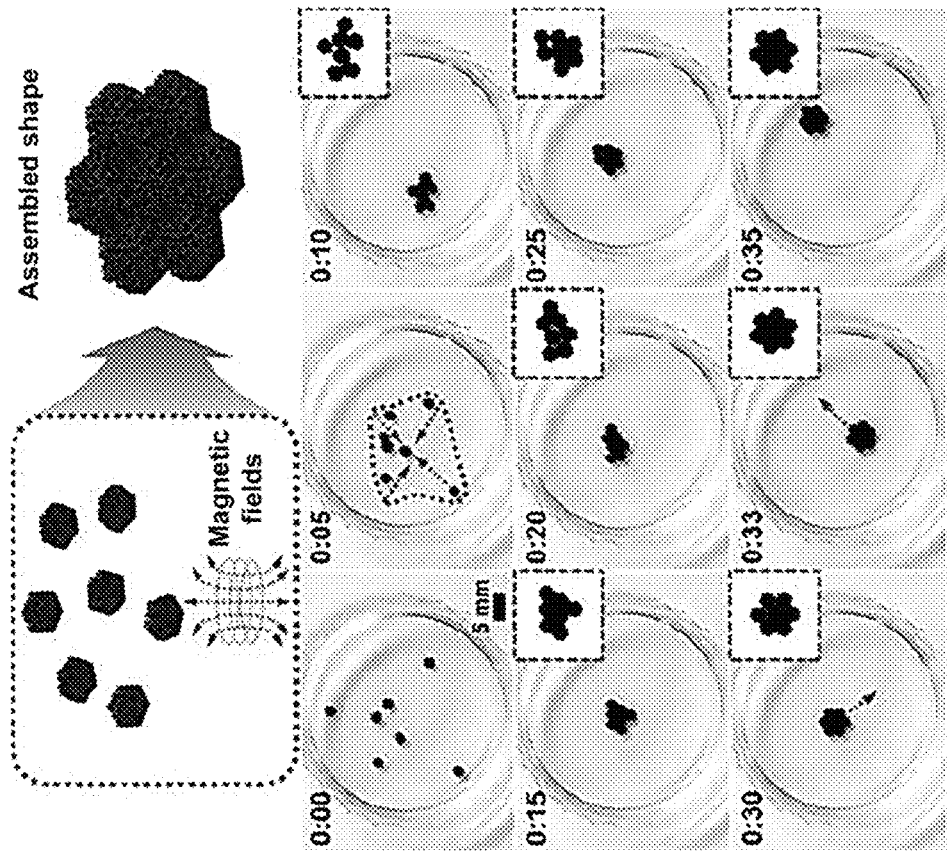
FIG. 4B provides images showing chitosan porous microrobots assembled in several shapes by external magnetic fields according to an example of the present disclosure.
Figure 4B:
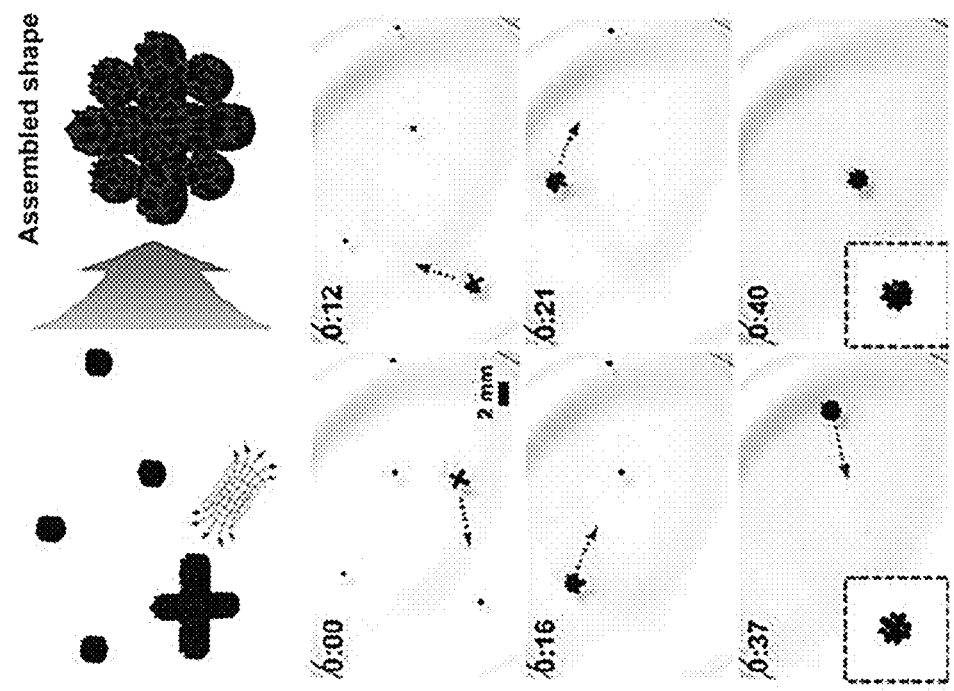

In order to examine magnetic reactivity of chitosan porous microrobots, microrobots were placed in a physiological salt solution similar to the inside of the body, followed by physical shaking, and then the magnetic reactivity of the microrobots was investigated using a permanent magnet, and the results are shown in FIGS. 4A and 4B.

It was verified that the chitosan porous microrobots were concentrated toward the permanent magnet (FIG. 4A). Especially, the chitosan porous microrobots were assembled in several shapes by external magnetic fields (FIG. 4B). That is, the movement of the chitosan porous microrobots according to the direction of a magnetic field was confirmed. This indicates that when chitosan porous microrobots were injected into the body, the movement of the chitosan porous microrobots can be controlled according to the direction of the magnetic field formed outside the body.

Example 2: Test of Actuation of Chitosan Porous Microrobot

In order to investigate the actual movement of a chitosan porous microrobot, the microrobot was placed and actuated in a chamber containing a physiological salt solution. The microrobot was moved in a desired direction by controlling magnetic fields of 40 mT and 1.8 T/m generated from an electromagnetically actuated coil device.

Figure 5:
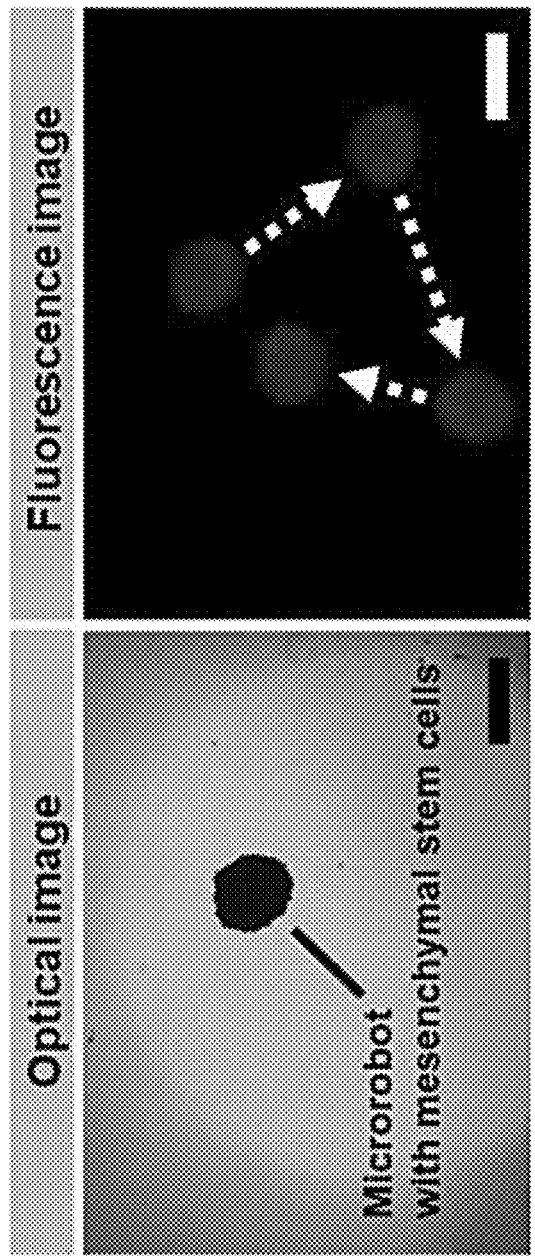
FIG. 5 provides images showing the actuation figure of a microrobot delivering mesenchymal stem cells (MSC) with stained cytoplasm according to an example of the present disclosure.

The actuation state of the chitosan porous microrobot delivering cells with stained cytoplasm was checked using a fluorescence microscope (FIG. 5). It was verified that the chitosan porous microrobot could be actuated while containing cells, and especially, the chitosan porous microrobot could be actuated without losing magnetic reactivity thereof even after containing cells. These results indicate that the chitosan porous microrobot containing cells can be manipulatively oriented through a magnetic field, and accurately deliver a therapeutic agent (cells or a drug) to be delivered to a lesion.

Example 3: Evaluation of Viability of Adipose-Derived Stem Cells and Macrophages Contained in Chitosan Porous Microrobot The viability of adipose-derived stem cells and macrophages contained in a cell spheroid composed of only stem cells and macrophages, in a chitosan porous structure (CPS), and in a chitosan porous microrobot (CPM) was evaluated.

Figure 6A:
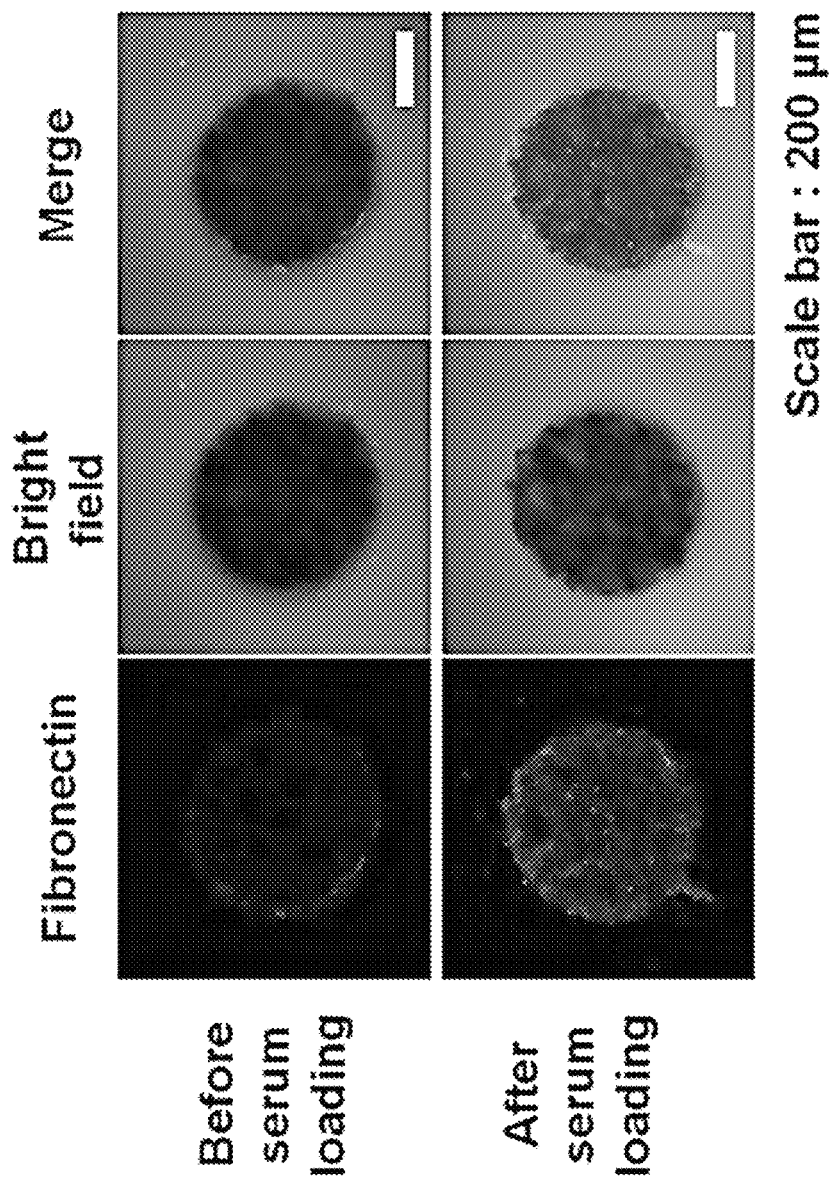
FIG. 6A provides fluorescent images of fibronectin, a cell adhesion-related protein, of a microrobot according to an example of the present disclosure.

In the culture of adipose-derived mesenchymal stem cells and macrophages (Raw 246.7) for cell viability evaluation, fetal bovine serum was added, so that fibronectin contained in the serum was allowed to bind to the surface and the inside of the microrobot well through an integrin receptor (FIG. 6A). The fibronectin bound to the microrobot serves to help a therapeutic agent (cells or a drug) to bind to the surface of the microrobot well.

After each type of cell spheroids, chitosan porous structures, and chitosan porous microrobots was dispensed into a round-bottom 96-well plate (Corning, USA), adipose-derived stem cells and macrophages cultured by adding fetal bovine serum were seeded with 30,000 cells/well each. At 24 hours (Day 1), 72 hours (Day 3), and 120 hours (Day 5) after cell seeding, the culture was removed from each well, and then 100 μL of the AlamarBlue cell viability reagent (Thermo Fisher Scientific Inc., USA) was added to each well together with the culture. At four hours after the addition, the fluorescent value of the supernatant was analyzed using a microplate reader (Varioskan Flash, Thermo Fisher Scientific) having excitation and emission wavelengths of 560 nm and 590 nm, respectively. The intensity detected in each sample on Day 1 was 100% as a basis, and based on this intensity, the intensities on Day 3 and Day 5 were calculated. In addition, the viability of adipose-derived stem cells and macrophages contained in the cell spheroid, chitosan porous structure, and chitosan porous microrobot were compared (FIGS. 6B and 6C).

Figure 6B:
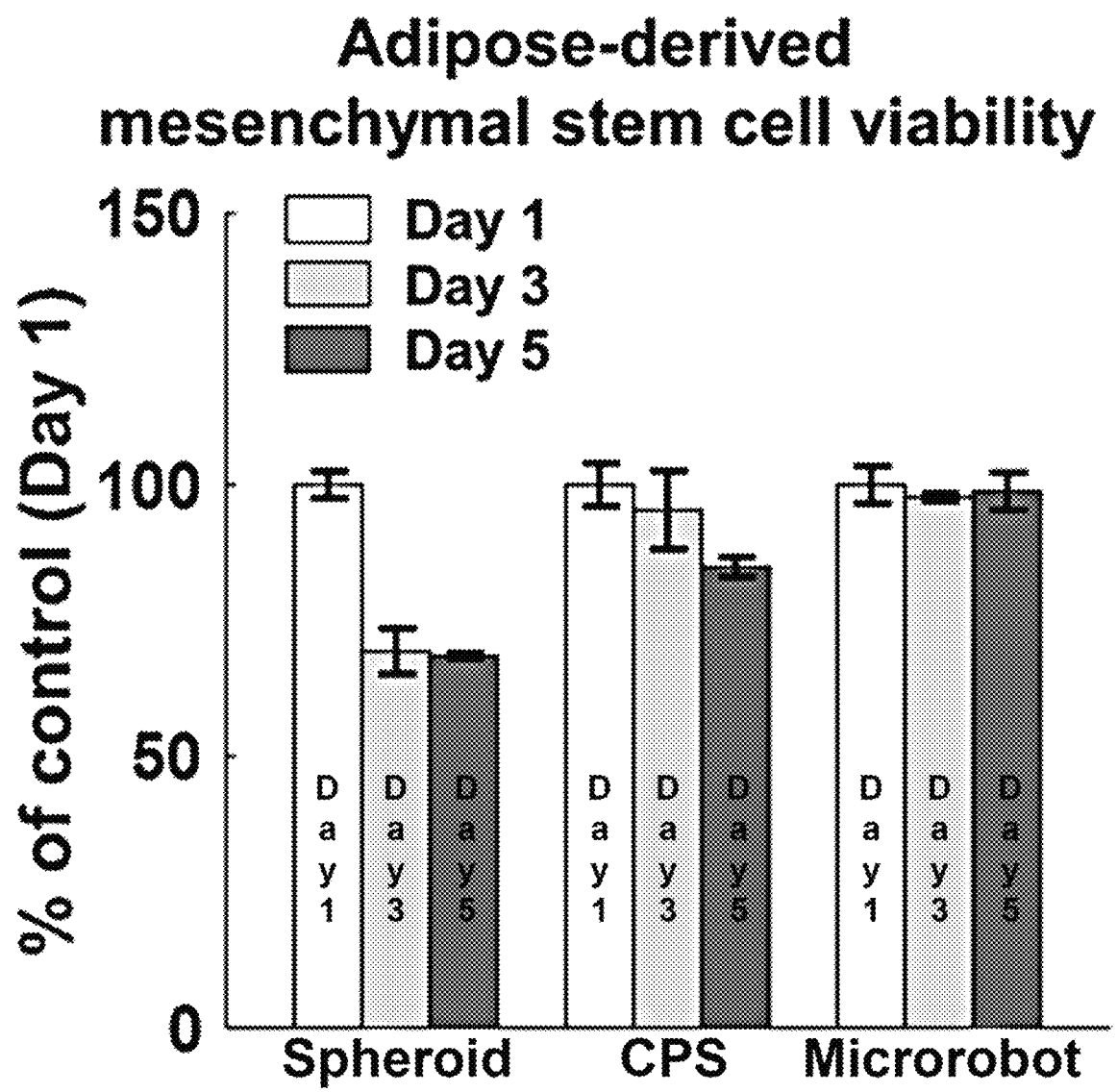
FIG. 6B is a graph showing the evaluation results of viability of adipose-derived mesenchymal stem cells loaded in a microrobot according to an example of the present disclosure.
Figure 6C:
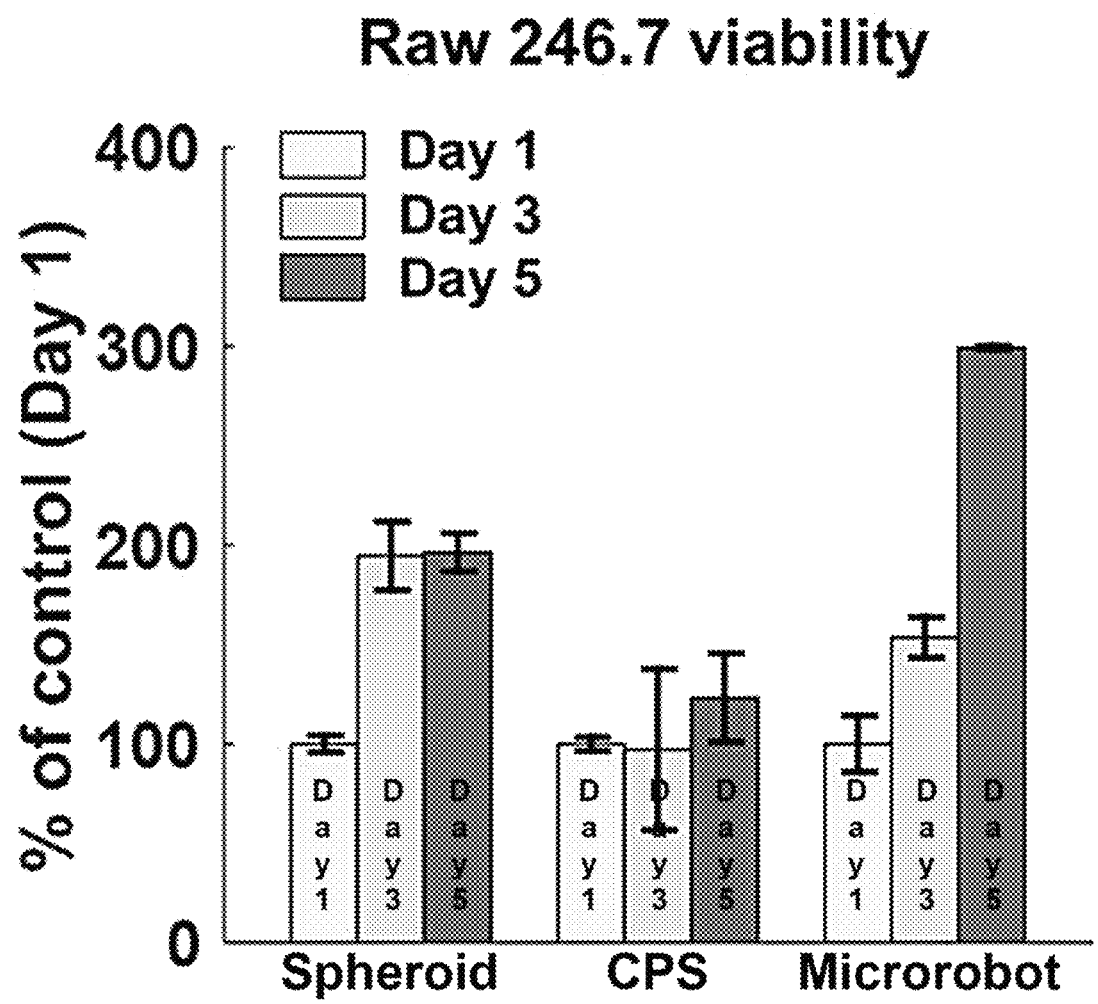
FIG. 6C is a graph showing the evaluation results of viability of macrophages loaded in a microrobot according to an example of the present disclosure.
Figure 7:
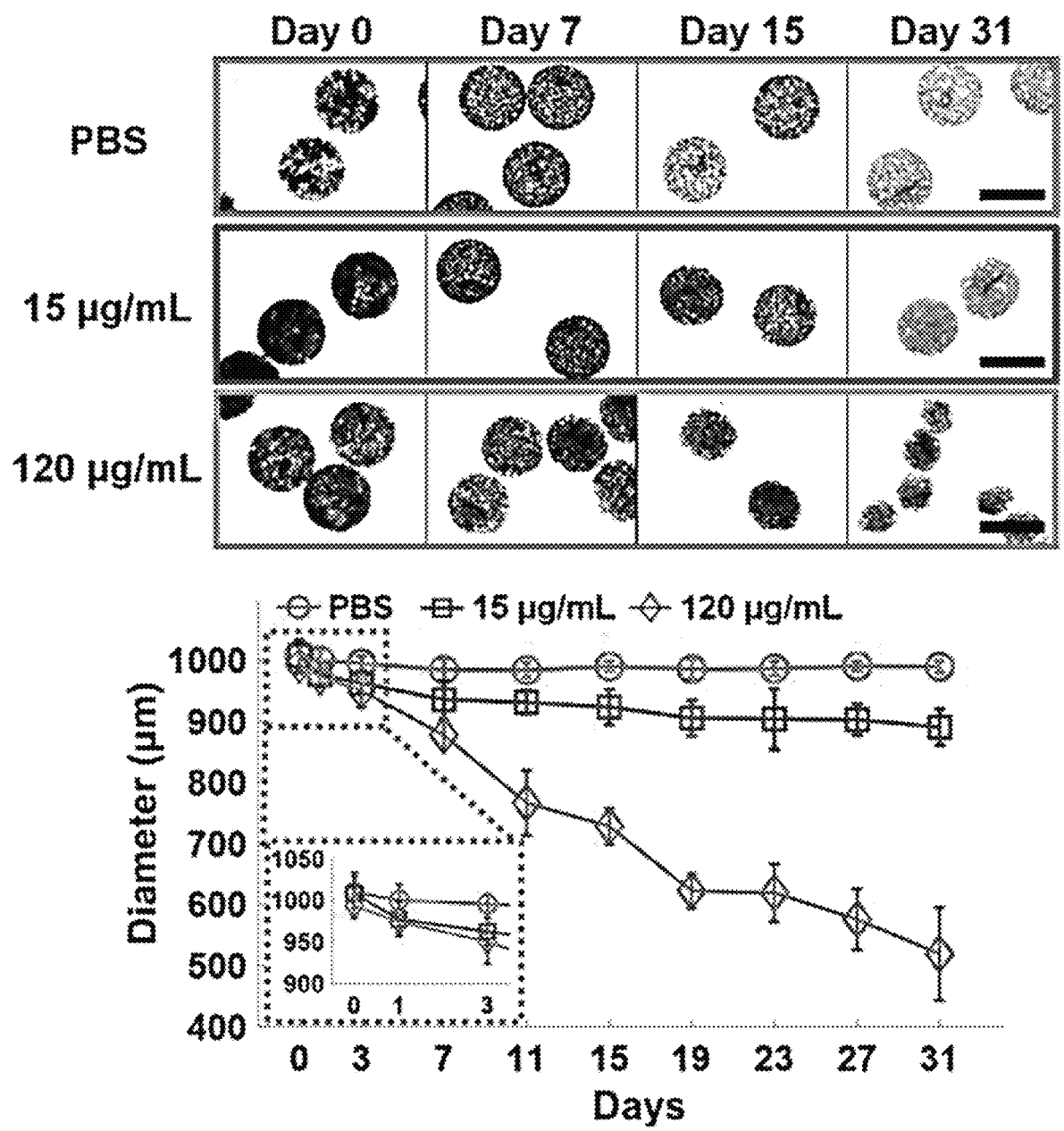
FIG. 7 is a diagram showing ex vivo degradation of a microrobot over time according to an example of the present disclosure.

As shown in FIGS. 6B and 6C, the spheroid composed of only adipose-derived stem cells and macrophages caused low cell viability due to a low-oxygen environment in the center portion of the cell spheroid. The chitosan porous structure lacks an amino group (e.g., fibronectin) that can serve to allow cells to adhere to the surface of chitosan, resulting in a deterioration in cell adhesion ability, causing low cell viability.

Whereas, the adipose-derived stem cells and macrophages contained in the chitosan porous microrobot showed the highest viability. The reasoning is that the surface of the chitosan porous microrobot was modified through the attachment of magnetic nanoparticles, and the fibronectin entirely bound to the inside or surface of the chitosan porous microrobot can help the adhesion of cells to effectively load the cells used as a therapeutic agent. Through such effective loading, the chitosan porous microrobot can deliver more cells to a target site.

Since the chitosan porous microrobot has a porous structure, the cells adhering to the inside or surface of the microrobot can receive sufficient oxygen and nutrients through the pore spaces constituting the porous structure.

Therefore, the fabricated microrobot does not affect cytotoxicity and can be easily degraded in vivo, and the magnetic nanoparticles attached to the surface of the chitosan porous microrobot can provide an environment suitable for cell growth and adhesion.

Example 4: Experiment of Degradation of Chitosan Porous Microrobot

Chitosan, which is a main ingredient of the chitosan porous microrobot, is known to be degraded by the enzyme lysozyme. Lysozyme is an enzyme that prevents bacterial infection by hydrolyzing mucus polysaccharides and the like contained in the cell walls of bacteria, and is an antibacterial enzyme produced by humans or animals. This lysozyme cleaves the glycosidic bonds of polysaccharide units in a polymer, and the degradation products having a small molecular weight are removed from the body. The chitosan degraded by the lysozyme enzyme in the body is present at a concentration of approximately 1 to 120 μg/mL in tissues in the body. In order to investigate the degradation of microrobot in the body, chitosan porous microrobots were cultured in 15 μg/mL and 120 μg/mL lysozyme and phosphate-buffered saline (PBS) for 31 days. In order to avoid the contamination of samples, lysozyme and phosphate buffered saline were exchanged every day. The size of the chitosan porous microrobot was observed using an optical microscope.

As a result of the experiment, the phosphate buffered saline had little effect on the degradation of the chitosan porous microrobot, but the size of the chitosan porous microrobot in the lysozyme solution gradually decreased by enzymatic degradation for 31 days. In particular, the degradation of the chitosan porous microrobot was accelerated in a high-concentration (120 μg/mL) lysozyme solution than a low-concentration (15 μg/mL) lysozyme solution, and a maximum size reduction of 47.6% was shown on Day 31. These results indicate that after the microrobots are delivered to a lesion site in the body and then release drugs and cells, the microrobots can be slowly degraded.

What is claimed is:

1. A microrobot comprising: a porous film with the pore space diameters of 35 to 130 μm; and magnetic nanoparticles attached to pore spaces of the porous film,
   wherein the porous film contains chitosan as a natural polymer,
   wherein the magnetic nanoparticles comprise ferumoxytol and collagen type I,
   wherein the magnetic nanoparticles are formed through electrostatic binding of ferumoxytol and collagen type I,
   wherein the microrobot has fibronectin attached to its inside or surface, and
   wherein stem cells or macrophages are attached to the fibronectin attached to the microrobot.

2. The microrobot of claim 1, wherein the porous film contains at least one element selected from the group consisting of C, O, and N, which are main ingredients of a polymer.

3. The microrobot of claim 1, wherein the diameter of the magnetic nanoparticles is 1 to 1,000 nm.

4. A method for fabricating a microrobot, the method comprising:
   a porous film manufacturing step of manufacturing a porous film contains chitosan as a natural polymer at −15° C. to −10° C.;
   a porous structure forming step of processing the porous film to form a porous structure;
   a microrobot preparing step of attaching magnetic nanoparticles comprising ferumoxytol and collagen type I and formed through electrostatic binding of ferumoxytol and collagen type I to the porous structure to prepare a microrobot; and
   a material loading step of attaching fibronectin to the microrobot and then loading stem cells or macrophages in the microrobot.

5. The method of claim 4, wherein in the porous structure forming step, the porous structure is formed by laser processing of the film.

* * * * *